(12) United States Patent
Gaucas et al.

(10) Patent No.: US 8,745,487 B2
(45) Date of Patent: Jun. 3, 2014

(54) SYSTEM AND METHOD FOR CREATING VARIABLE DATA PRINT SAMPLES FOR CAMPAIGNS

(75) Inventors: Dale Ellen Gaucas, Penfield, NY (US); Kirk J. Ocke, Ontario, NY (US); Michael David Shepherd, Ontario, NY (US); Reuven J. Sherwin, Ra'anana, IL (US)

(73) Assignee: Xerox Corporation, Norwalk, CT (US)

( * ) Notice: Subject to any disclaimer, the term of this patent is extended or adjusted under 35 U.S.C. 154(b) by 241 days.

(21) Appl. No.: 13/050,021

(22) Filed: Mar. 17, 2011

(65) Prior Publication Data

US 2012/0240035 A1    Sep. 20, 2012

(51) Int. Cl.
*G06F 17/00* (2006.01)
(52) U.S. Cl.
USPC .......................................................... 715/243
(58) Field of Classification Search
CPC ..................................................... G06F 17/212
USPC ......................................................... 715/243
See application file for complete search history.

(56) References Cited

U.S. PATENT DOCUMENTS 6,032,004 A    2/2000  Mirabella, Jr. et al.
2010/0328725 A1  12/2010  Gaucas et al.

OTHER PUBLICATIONS

XMPie uCreate User Guide, Version 2.0, http://www.xmpie.com/ Jan. 2006, pp. 1-76.
XMPie uDirect Standard Tutorial, http://www.xmpie.com/?id=1274, Jan. 12, 2011, pp. 1-3.
XMPie uProduce RURL Wizard, http://www.xmpie.com/brochures, Jan. 12, 2011, p. 1.
Adobe InDesign Plugins, http://www.adobe.com/products/plugins/ indesign/, Jan. 12, 2011, pp. 1-26.
Protege Ontology Editor, http://protege.stanford.edu/, Jan. 12, 2011, p. 1.
Magic Draw UML, http://www.magicdraw.com/, Jan. 5, 2011, pp. 1-6.
James Maivald et al., AdobePress, In Design's XML Features, Feb. 9, 2009, pp. 1-23.

*Primary Examiner* — Laurie Ries
*Assistant Examiner* — Shawn S Joseph
(74) *Attorney, Agent, or Firm* — Gibb & Riley, LLC

(57) ABSTRACT

Methods and systems herein receive a selection of at least one variable data printing (VDP) pattern from a first user to compose an initial sample design. The methods receive image, text, and graphics into the initial sample design from the first user and the user tags such image, text and graphics with VDP pattern elements. The processes of receiving the image, text, and graphics and tagging alter the initial sample design into the tagged sample design. Further, the methods and systems can automatically convert the tagged sample design into at least one different format file. The methods and systems can automatically provide the different format file to at least one second user. Additionally, the second user can include data components into the different format file to support the composition of a targeted marketing campaign sample.

20 Claims, 10 Drawing Sheets

FIG. 7

SYSTEM AND METHOD FOR CREATING VARIABLE DATA PRINT SAMPLES FOR CAMPAIGNS

BACKGROUND

Embodiments herein generally relate to variable data printing (VDP) and more particularly to systems and methods for creating variable data print samples for campaigns. Companies that provide direct mail and marketing campaigns for businesses and organizations frequently use sample campaign collateral to show potential clients what is possible using VDP technology. Often, it is desirable to be able to quickly prototype sample VDP collaterals near a the close of a sale, or alternatively, to have prepared samples that utilize different data components to show a client. Because development of samples requires resources, these companies may look to the VDP software vendor to provide them with a method for easy sample creation, or with a rich sample set that would need minor adaptation for a presentation to a particular prospect. An efficient approach is needed to develop such samples, especially when separate specialist roles need to collaborate in their development.

SUMMARY

Various exemplary methods herein operate through one or more computerized devices (such as a tool) and provide a first user (such as a graphic designer) with a selection of various variable data printing (VDP) patterns that represent different campaign types. Each of the VDP patterns comprises a plurality of knowledge concepts. The knowledge concepts are knowledge engineered from commonly used types of marketing campaigns and may not necessarily be dependent upon or pre-associated with any schemas, VDP logic, or graphics. Knowledge concepts are descriptors/tags for the types of semantic elements that appear in a graphic designer's work.

The knowledge concepts themselves are expandable based on concept relationships and data properties, and form the basis of design tags. The methods receive image, text, and graphics from the first user into an initial sample design. The 'first user' is can be, for example, a graphic designer or one who goes about tagging the image, text, and graphics in the initial sample graphic design. When the VDP pattern is selected, the underlying knowledge concepts are presented to the user (using, for example, a pallet) to allow the user to do the tagging of such a design as the user creates the graphic design. Each of the image, text, and graphics represent variable or fixed text or images. The graphic designer creates image, text, and graphics in the graphic design area and then tags such image, text, and graphics with tags (pattern elements) taken from a tags palette. In some cases, default or placeholder text or graphics can be inserted automatically when a graphic content area is tagged. The methods perform this tagging to create a tagged sample design.

Thus, the methods receive image, text, and graphics into the initial sample design from the first user. The user tags the image, text, and graphics with pattern elements to add metadata to the image, text, and graphics. Further, as one option, the methods can insert sample text into the selected image, text, and graphics. The tagging of the image, text, and graphics alters the initial sample design into a tagged sample design.

If necessary, the methods may automatically convert the tagged sample design into one or more second files that have a different format. The methods can automatically provide the different format file to one or more second users (such as a data specialist or a logic developer). While the design's metadata may be converted from one format to another, this is not required. The metadata could be exported in a format that is readable by other roles if they choose not to view the design and tags within the original tagging environment. The semantic tags that were selected by the first user are exported in a format that the logic developer or data specialist is familiar with. This format is one that the logic developer or data specialist could use to respectively, create logic or data for the tag's semantics. The sample logic and data that is created by the second users is then saved so that it can be applied against the tagged graphic design sample to compose a set of VDP samples that conform to the design's metadata.

The tagged graphic design with metadata and the sample VDP logic and the sample data sources are then used to compose a set of VDP samples that conform to the design's metadata. The samples are for communication among all campaign roles and not restricted just to the first user.

An exemplary system embodiment herein comprises one or more computerized devices. Further, one or more networks are operatively connected to the computerized devices. The computerized devices provide a first user a selection of various variable data printing (VDP) patterns. In response, the computerized devices receive a selection of at least one of the VDP patterns from the first user.

The computerized devices then automatically load knowledge concepts related to the selected VDP pattern as, for example, a palette of tags (pattern elements) into a first VDP module. The computerized devices receives image, text, and graphics within the initial sample design from the first user and the user tags the image, text, and graphics with pattern elements. The receipt of the image, text, and graphics and the tagging alter the initial sample design into the tagged sample design.

Next, the computerized devices can optionally automatically convert the tagged sample design into at least one different format file that is different than the format used by the first VDP module. The computerized devices can also automatically provide the different format file to at least one additional user using the network. The computerized devices can, based on input from the second user, produce VDP logic or data components that can subsequently be applied against the tagged design to compose a marketing campaign sample.

Thus, the embodiments herein provide a system and method to assist in the formation of targeted marketing campaign samples. The technique starts with a graphic designer selecting a variable data printing (VDP) pattern representing a campaign type such as a "Product Offer" or an "Invitation to an Event" from a predefined set. VDP pattern selection causes relevant knowledge concepts (VDP pattern elements) to be loaded into the VDP module, where the concepts themselves are expandable based on concept relationships and data properties, and present available tags. The graphic designer interacts with this view to tag and associate a design with VDP pattern elements. The resulting design is saved with the tags and underlying knowledge model, to provide information to the logic developer and data specialist to support composition of the campaign sample with logic and data. The tags optionally are exported to a format that is readable by tools used by the logic developer (e.g., uPlan) and the data specialist (e.g., Excel), thereby helping them to define the data schema and business logic to drive the campaign. Using this technique a graphic designer can quickly assist a client in developing the base of a targeted campaign without the need for a campaign brief, campaign logic or campaign data sets.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 7 is a schematic diagram illustrating a wizard page where placeholders are associated with image, text, and graphics defined in a plan file;

DETAILED DESCRIPTION

Figure 1:
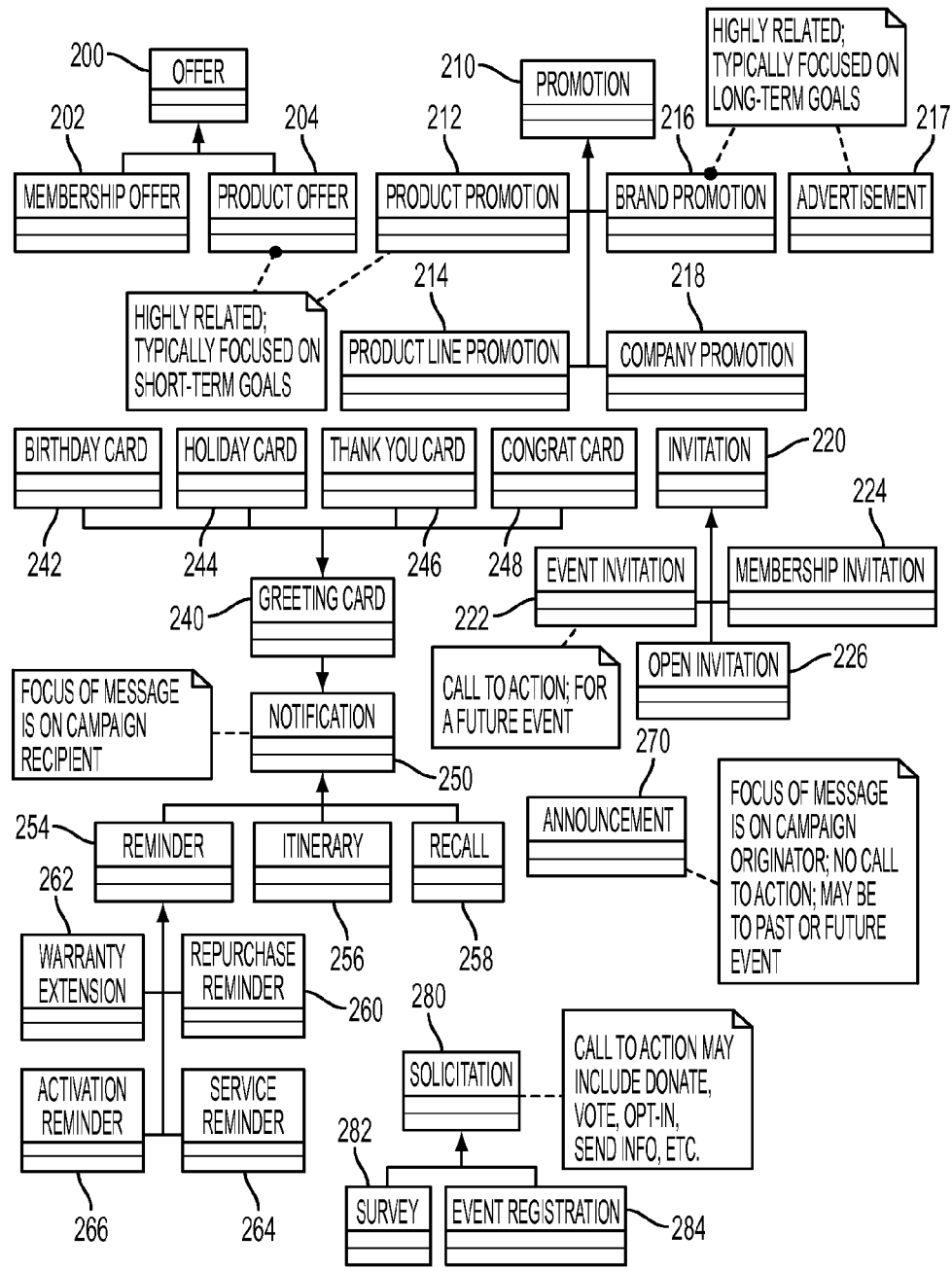
FIG. 1 is a schematic diagram illustrating VDP patterns for campaign types.

The embodiments herein provide systems and methods for using variable data printing (VDP) patterns to represent marketing campaign types, and for creating VDP campaign collateral samples based on a VDP pattern, for tagging a sample graphic design with VDP pattern elements that are automatically available upon selection of a VDP pattern. These embodiments tag a sample graphic with the elements that comprise a VDP pattern. Thus, the embodiments herein convey potential requirements for adding logic and data to the VDP sample by people performing other roles in the marketing campaign process.

The embodiments herein provide a module of a VDP environment that facilitates the development of sample marketing campaign collateral. The ideas presented herein include knowledge-assisted systems and methods that enable a graphic designer to (1) produce a graphic design sample without the need of a campaign brief, campaign logic or campaign data sets, (2) collaborate with a logic developer and a data specialist in developing a generic sample set that utilizes different logic and data components, and (3) collaborate with the client in refining a sample.

These systems and methods enable a graphic designer to select from a set of predefined VDP patterns representing a campaign type such as a "Product Offer" or an "Invitation to an Event." A VDP pattern selection causes relevant knowledge concepts (known as VDP pattern elements) to be loaded into the VDP module where the concepts themselves are expandable based on concept relationships and data properties, and form the basis of design tags. This knowledge view guides the graphic designer in creating and tagging a design sample for campaign collateral in the absence of campaign logic or campaign data. The resulting design can be saved with the tags and underlying knowledge model, thereby providing information to the logic developer and the data specialist who may play collaborative roles in supporting the composition of the sample with logic and data components. The tagged design can also be used to help an interested client develop a detailed campaign brief by presenting the possible options for sample content.

In current VDP environments, graphic design tagging is typically done through the use of a desktop publishing program (DTP) plug-in. For example, some plug-ins for InDesign (available from Adobe Systems, Inc., San Jose, Calif., USA) display a view of the static and variable information that may be incorporated into the graphic design. This information, provided by the logic developer for the VDP campaign, has a correspondence with graphic assets, data schemas, and rules. The data schemas align with customer data sources obtained from the data specialist, and the rules incorporate business logic obtained from the campaign brief.

The embodiments herein provide a knowledge-assisted creative design module for a VDP designer that enables the production of design samples prior to receiving a complete campaign brief, campaign logic, or campaign data sources. The module is based on: modeling a campaign type through the use of a VDP campaign pattern ontology developed by a knowledge engineer; leveraging VDP elements which are the VDP pattern high-level concepts, sub-concepts, related concepts, and data properties; selection of a VDP pattern by a graphic designer; automatic displaying of VDP elements for a loaded VDP pattern; enabling a graphic designer to expand concepts to sub-concepts, related concepts and data properties; supporting tagging of design areas in a graphic design via selection of pattern elements by the graphic designer; optional automatic insertion of generic text or sample text for a tagged design area; saving a tagged graphic design in a format accessible by the logic developer and the data specialist during a collaboration to incorporate sample logic and data components.

Several embodiments are possible for the disclosed module. One approach is a DTP plug-in that enables "virtual" tagging of design areas where the tags communicate semantic information to the collaborating logic developer and data specialist, where the semantics are specific to the type of campaign for which the graphic designer and/or marketing service provider wants to produce samples. Another approach is a web-based application that enables the design of basic templates with placeholders that then can be imported into a design environment that supports incorporation of campaign logic and data as well as graphic design refinement.

With respect to the campaign knowledge model, VDP patterns represent high-level campaign types, such as those shown in FIG. 1. More specifically, each of the patterns: offer 200, promotion 210, invitation 220, notification 250, announcement 247, solicitation 280 have various associated patterns (e.g., sub-patterns). Therefore, for example, the offer 200 pattern is linked to other sub-patterns including membership offer 202 and product offer 204. The product offer 204 and product promotion 212 highly relate to and typically focus on short-term goals. Similarly, the promotion 210 pattern is linked to other sub-patterns including product promotion 212, brand promotion 216, advertisement 217, product line promotion 214 and company promotion 218. The brand promotion 216 and advertisement 217 highly relate to and typically focus on long-term goals.

The invitation 220 is linked to other sub-patterns including event invitation 222, membership invitation 224, and open invitation 226. The event invitation 222 can call to action for a future event. In notification 250, the focus of the message is on the campaign recipient. In announcement 270, the focus of the message is on the campaign originator and no call to action may be to past or future. The notification 250 is linked to other sub-patterns including birthday card 242, holiday card 244, thank you card 246, congratulations card 248, greeting card 240. The notification 250 is linked to other sub-patterns including reminder 245, itinerary 256, recall 258, warranty extension 262, repurchase reminder 260, activation reminder 266, and service reminder 264. Similarly, the solicitation 280 calls to action may include donate, vote, opt-in, send info, etc. The solicitation 280 is linked to other sub-patterns which include survey 282 and event registration 284.

Figure 2:
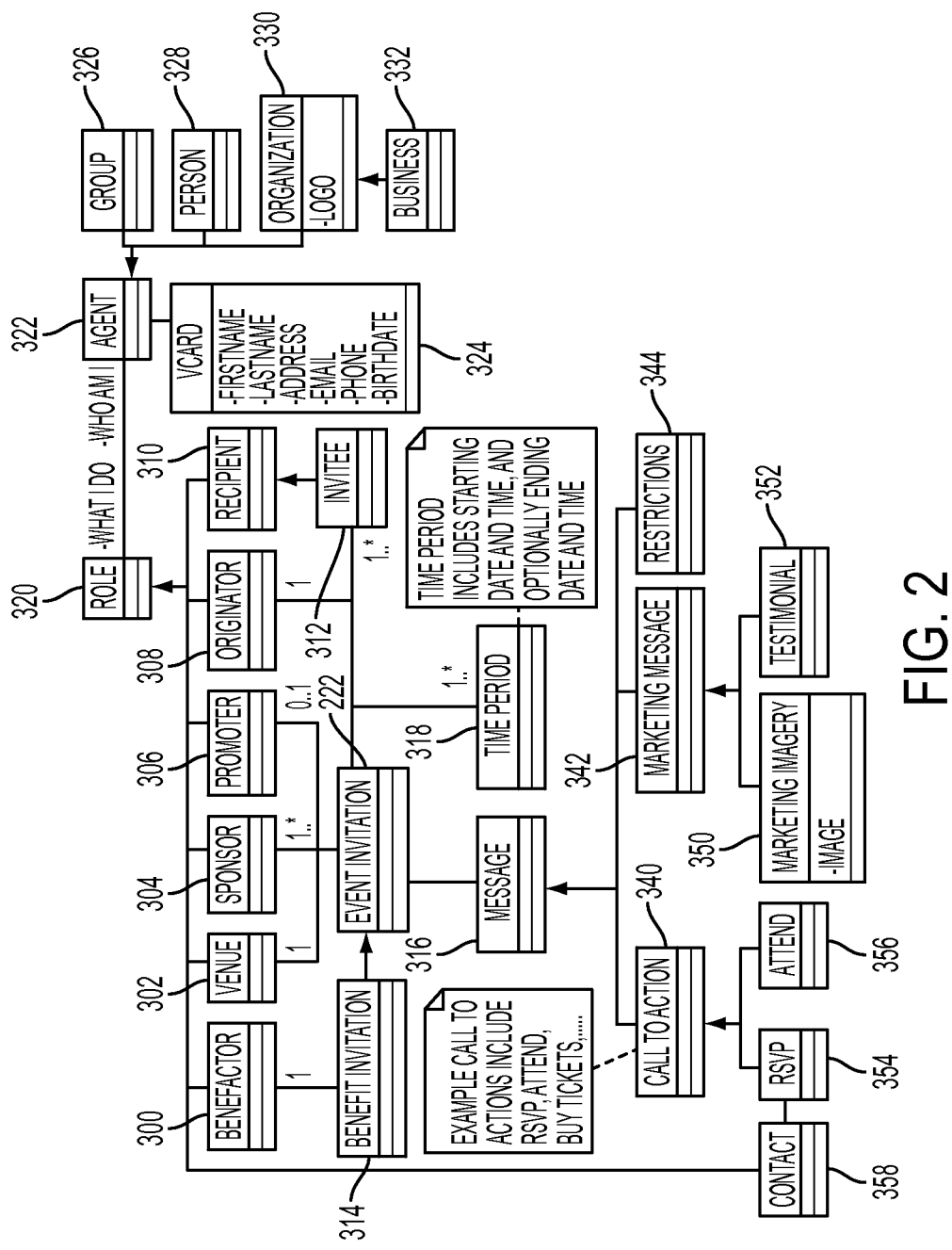
FIG. 2 is a schematic diagram illustrating a knowledge model for a Event Invitation VDP pattern.
Figure 3:
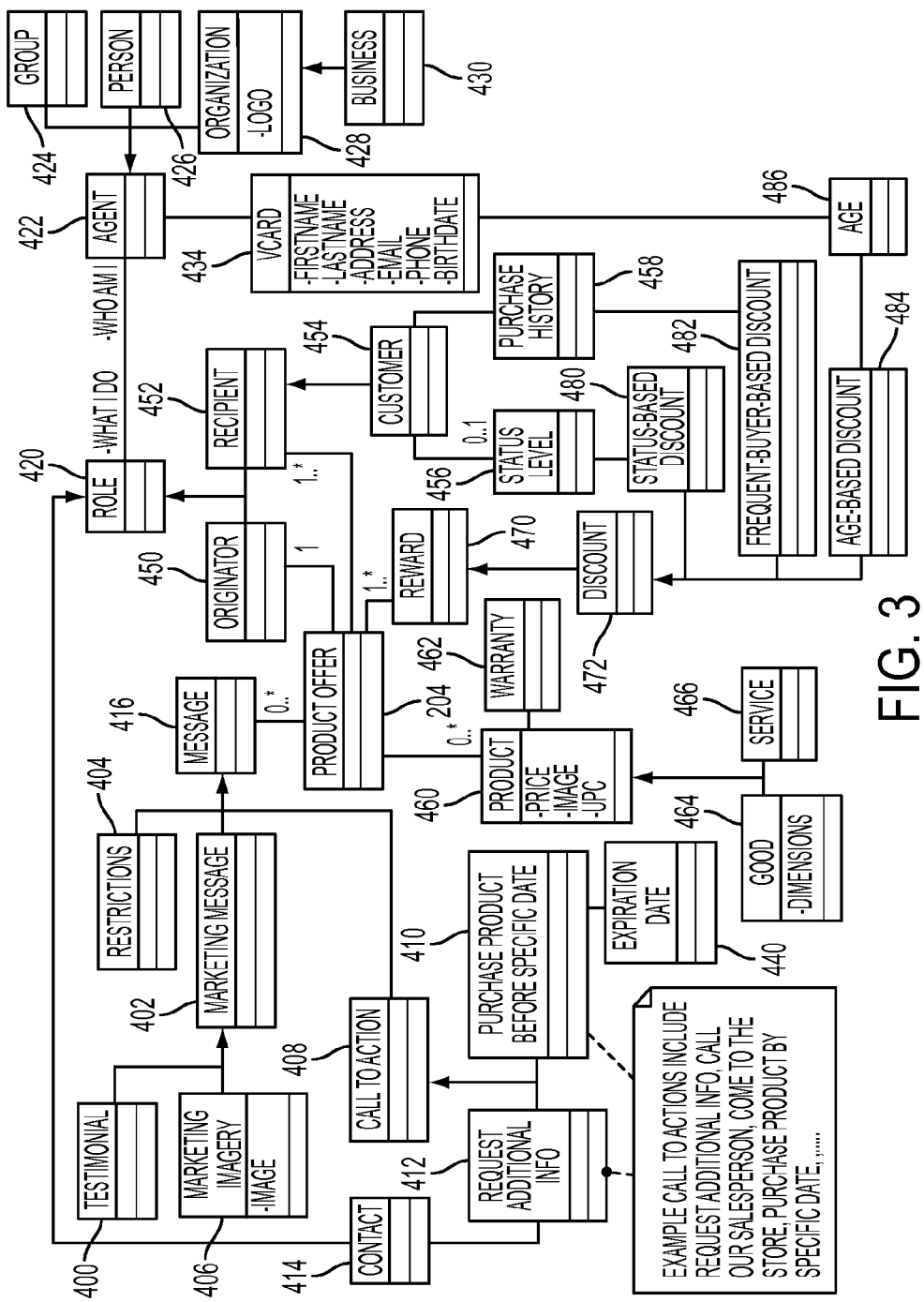
FIG. 3 is schematic diagram illustrating a knowledge model for a Product Offer VDP pattern.

FIG. 2 and FIG. 3 show examples of partial knowledge models for the event invitation 222 pattern and product offer 204 pattern in an object modeling format (i.e., MagicDraw UML, available from Plano, Tex., USA) that incorporates concepts, relationships and data properties.

For example, in FIG. 2 event invitation pattern 222 includes the concept venue 302 which may have a data property corresponding to "address." Similarly, the event invitation pattern 222 includes the concepts sponsor 304, promoter 306, originator 308, recipient 310, benefit invitation 314, invitee 312, message 316, and time period 318. The time period 318 includes starting date and time, and optionally ends the date and time. The concept benefit invitation 314 includes the concept benefactor 300. The concept message 316 includes sub-concept marketing message 342, call to action 340, and restrictions 344. The sub-concept marketing message 342 includes marketing imagery 350 and testimonial 352. The sub-concept call to action 340 for example, can include RSVP, attend, buy tickets, etc. The sub-concept 340 includes contact 358, RSVP 354 and attend 356. The agent 322 includes role 320, and VCard 324. The VCard 324 can include first name, last name, address, email, phone, birthdate, etc. Agent 322 includes group 326, person 328, organization 330, and business 332.

For example, FIG. 3 includes product offer 204 that includes message 416, product 460, originator 450, reward 470, discount 472, and recipient 452. Similarly, message 416 includes marketing imagery 406, marketing message 402, restriction 404, call to action 408, contact 414, request additional information 412, and purchase product before a specific date 410. Item 408 can include request additional information, call a salesperson to come to the store, purchase the product by a specific date, etc. Item 410 includes 440 expiration date. Another concept 460 product includes goods 464, warranty 462, and services 466. Concept recipient 452 includes customer 454 that includes status level 456 and purchase history 458, status-based discount 480, frequent-buyer based discount 482, and age-based discount 484. Agent 422 includes role 420 and VCard 434, and age 486. Agent 422 also includes group 424, person 426, organization 428, and business 430.

The knowledge models contain concepts that are relevant to the domain of marketing campaigns, but at the level shown in these figures, they are domain-independent in the sense of not providing detailed sub-concepts or concept instances. For example, in FIG. 3 "Service" is not expanded to show "Car Wash Service" as a sub-concept, nor is "Product" instantiated to show "iPod" as a specific product.

These models can, however, support the addition of domain-dependent concepts by having more detailed patterns. For example, a "New Wine Promotion" might have concepts that may not appear in other types of Promotions such as "Health-Warning Information." In this case, "Health-Warning Information" may be viewed as a sub-concept of "Message" which is also a concept appearing in FIG. 2 and FIG. 3.

The methods described herein can support the graphic designer's additions of sub-concepts to a pattern in order to communicate more specifics to the other VDP designers. For simplicity, such additions of new sub-concepts at design-time can be limited to only sub-classing existing concepts and excludes the capability to create additional properties or form new relationships to other concepts regarding the new sub-concept.

There is a trade-off between detailing a pattern and model complexity. Often a trade-off decision can be guided by usability experiments and knowledge engineering from existing campaign collaterals. For simplicity, the models in FIG. 2 and FIG. 3 show placeholders for names of concept relationships and most of the data properties. This type of information, however, is supported by knowledge modeling tools such as Protégé (available from the Stanford Center for Biomedical Informatics Research, Stanford, Calif., USA). The VDP pattern knowledge model as described above can form the basis of a VDP module that enables a graphic designer to: select and load a VDP pattern that represents a campaign type; create a sample design for campaign collateral that is guided by viewable concepts and data properties from the VDP pattern; tag the design with such concepts and their data properties; view the tags by "hovering" over or selecting design content areas, or through the use of automatic insertion of descriptive placeholder text; and save the design with the tags so it can be loaded into a different module for viewing or definition of VDP logic and data components.

Such tags can be used to support the subsequent development of a schema, rules and data by collaborators who extend the sample. For example, a sample design may be tagged with the concept "Status-Based Discount" which is ultimately dependent upon a data property representing the name of the "Status Level" associated with a customer. This suggests to the logic developer and the data specialist that information about a customer's status level name is useful for incorporating sample data schemas and sample data sources. It also helps the logic developer define a rule that specifies a "Discount" based on customer "Status Level." In addition, it helps a client see how a sample can be adapted to different business logic such as having the discount be based on a customer characteristic such as age. As another example, a sample design area could be tagged with the concept "Call to Action." This suggests to a graphic designer who subsequently refines the design that the "Call to Action" tag could be replaced with a sub-concept such as "Request Additional Info."

Note that the vocabulary used in VDP patterns, data sets, and client briefs may be different. A benefit of the embodiments herein is that the VDP patterns provide enough context to support collaboration among the different roles in developing and modifying a sample.

The following section presents two exemplary embodiments. One embodiment is a plug-in that would use a VDP pattern-based palette to guide a graphic design and the tagging of content areas with semantic information. The second exemplary embodiment is a web application that uses a VDP pattern-based palette to guide the design of a basic template with placeholders. The design could then be downloaded and imported to a desktop publishing environment for further graphic refinement.

Figure 4:
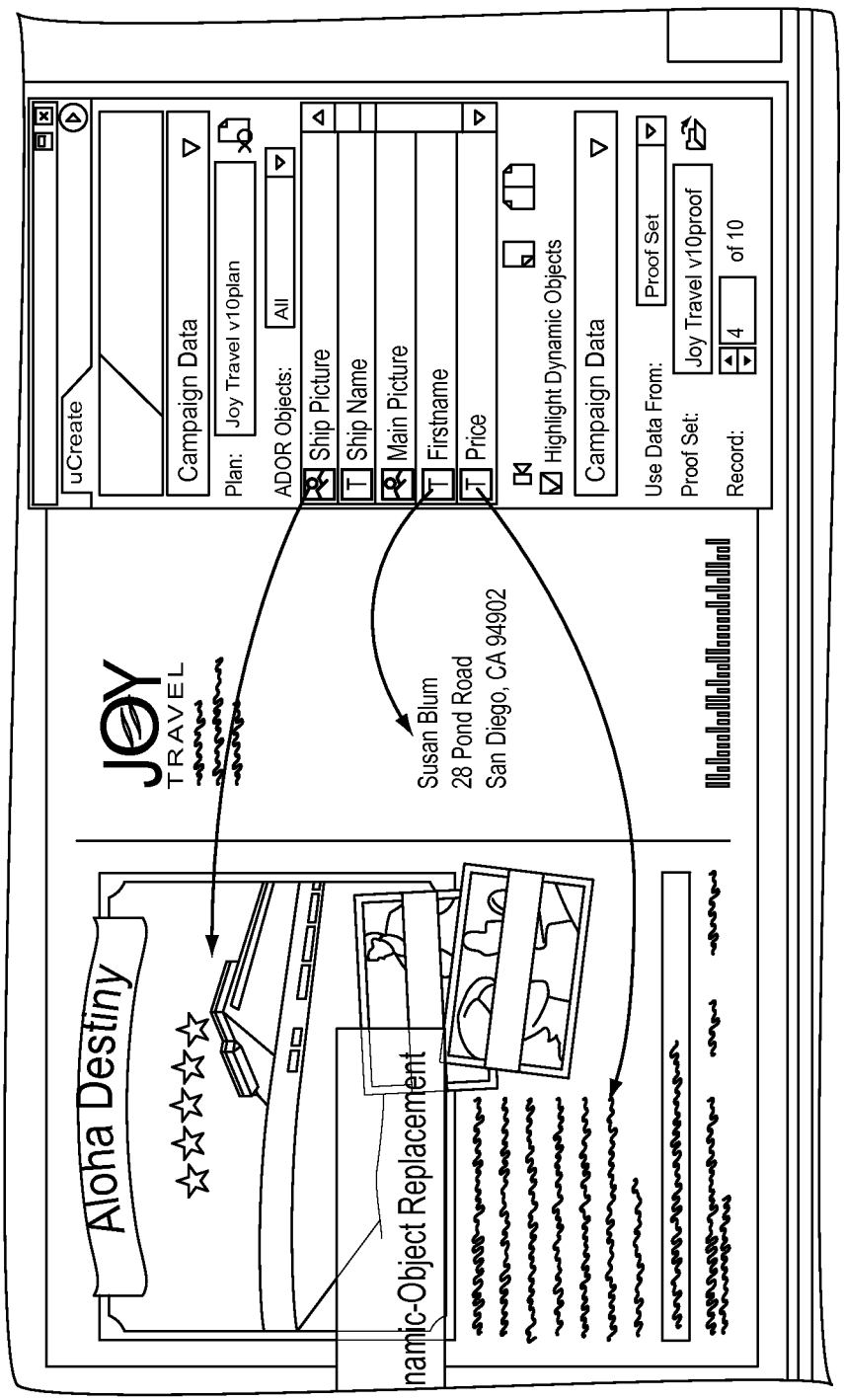
FIG. 4 is a schematic diagram illustrating tagging of a design.
Figure 5:
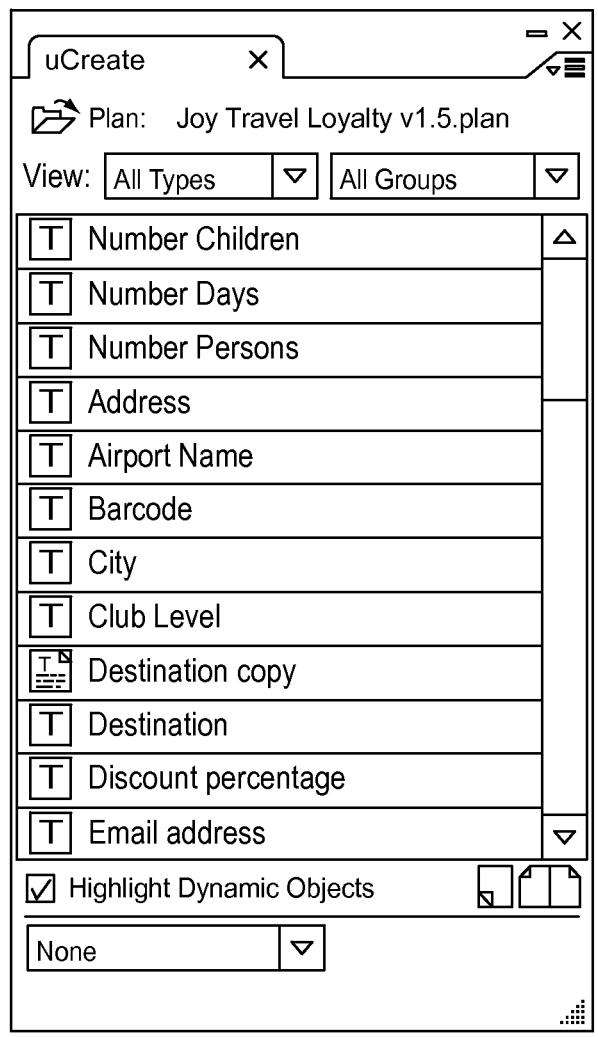
FIG. 5 is a schematic diagram illustrating uCreate palette corresponding to information based on a data schema.

FIG. 4 shows an example plug-in that enables a graphic designer to tag design areas with selectable objects (e.g., ship picture, first name, price, etc.) from a palette where the objects represent variable or fixed text or images and are dependent upon pre-defined data schemas, business logic, and graphics. FIG. 5 illustrates a palette corresponding to information from a data schema and logic rules that use that schema. The plug-in embodiment has an object selection window similar to the one shown in FIG. 5, but instead where the selectable elements are derived from an imported VDP pattern, which is independent of a data schema, or a plan file that includes logic rules. With the disclosed plug-in, a selected element may be expandable or may result in a pop-up window. The additional information from an expansion is derived from the underlying knowledge model of the imported VDP pattern, i.e., a model such as those depicted in FIG. 2 and FIG. 3.

Figure 6:
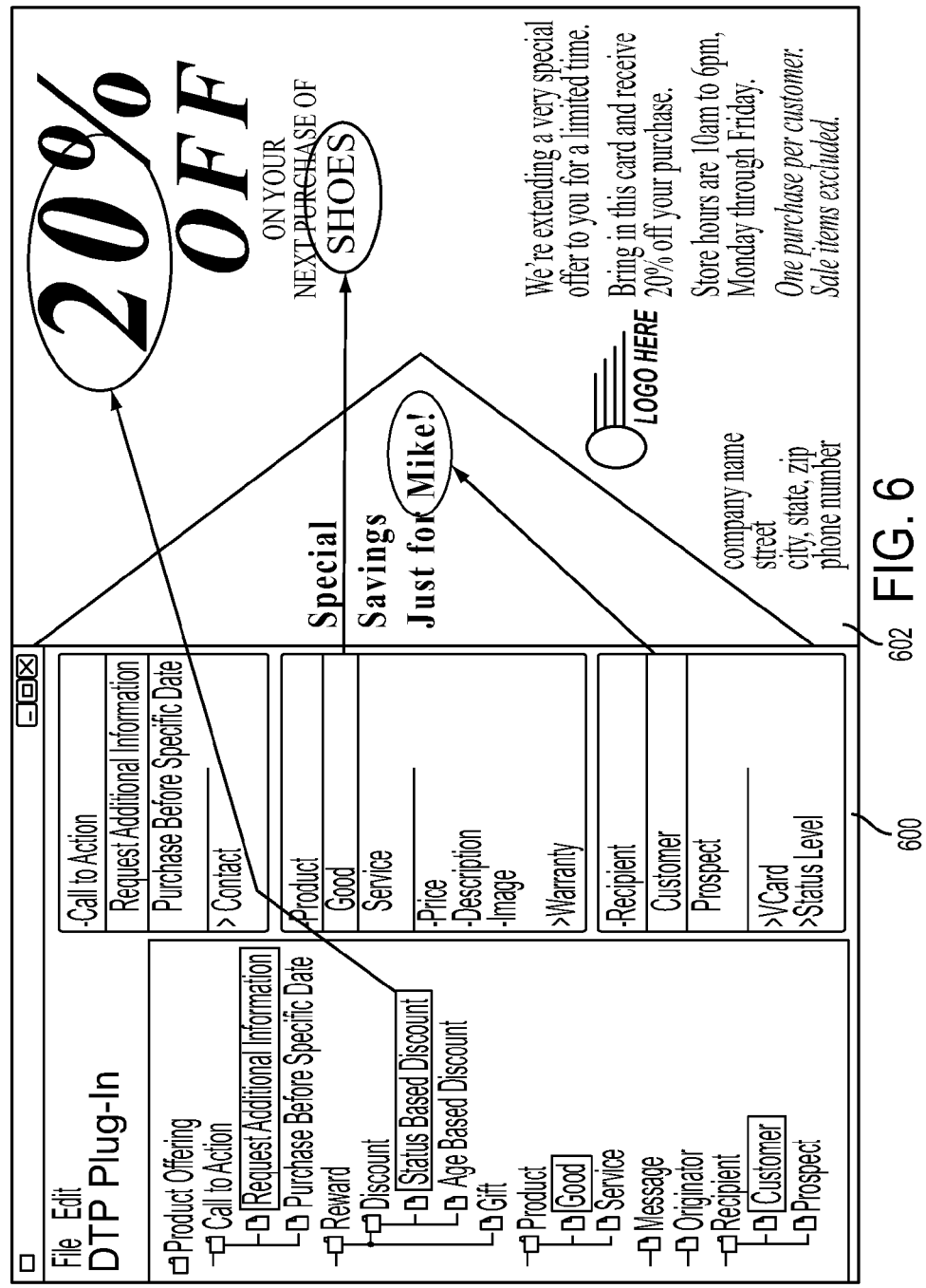
FIG. 6 is a schematic diagram illustrating tagging a design with pattern elements using a Product Offer VDP pattern palette.

In the plug-in embodiment, the selectable elements as exemplified in the left hand side window of FIG. 6 guide the designer of the sample in terms of what information to incorporate in the sample, and the object tags add metadata to the design. The metadata provides semantic information to a logic developer and a data specialist who may subsequently develop sample logic and data components, or to a client who may want to use a variant of the sample. The metadata captured by the tags can be stored in several ways when saving a sample graphic design by using variations/extensions of the mechanism already in place in the DTP plug-in for a VDP environment. The metadata can also be exported in a format that is readable by people performing other roles, if they choose not to view the design and tags within the disclosed plug-in environment.

The plug-in simplifies the presentation of the knowledge model for usability, e.g., by suppressing relationship names, possibly collapsing concepts, not showing inverse relationships, etc. This simplification may be achieved through meta-information added by the pattern developer, or through semi-automated methods.

FIG. 6 depicts an example operation of the disclosed plug-in. More specifically, FIG. 6 shows tagging a design using a product offer VDP pattern palette with expandable elements and pop-up windows. The left hand side of the plug-in window represents the main palette for the loaded VDP pattern, in this case "Product Offer." Thus, the palette 600 on the left side of FIG. 6 illustrates VDP pattern elements (also referred to as knowledge elements from the above-described the knowledge model) that the user can use to tag (associate with) the image, text, and graphics items that are added to the graphic design 602 on the right side of FIG. 6 by the graphic designer. This tagging process adds metadata to each item of image, text, and graphics that appear in different content areas in the graphic design 602 when each VDP pattern element is associated that a specific image, text, or graphic item in the graphic design by the user from the palette 600. This palette contains the above-described selectable VDP pattern elements associated with that pattern, i.e., "Call to Action," "Reward," "Product, Message," "Originator," "Recipient."

Elements with a folder icon or a + symbol in FIG. 6 can be expanded to sub-elements. Selecting a concept may result in a pop-up window for that concept. A concept window enables sub-concept expansion, or selection of a related concept (denoted by the > symbol), which results in a pop-up window for that related concept. A concept window may also have data properties denoted by a * symbol. The graphic designer can tag image, text, and graphics by highlighting or double-clicking text or image areas in the design, and then by double clicking a concept or data property in the palette or pop-up windows.

The web application embodiment uses a VDP pattern-based palette to support the design of a basic template with placeholders. The template can then be downloaded and imported into a desktop design environment. Using such an environment, the template graphic design can be enhanced and the placeholders associated with objects from a plan file that contains campaign logic, resulting in a VDP dynamic document.

Figure 7:
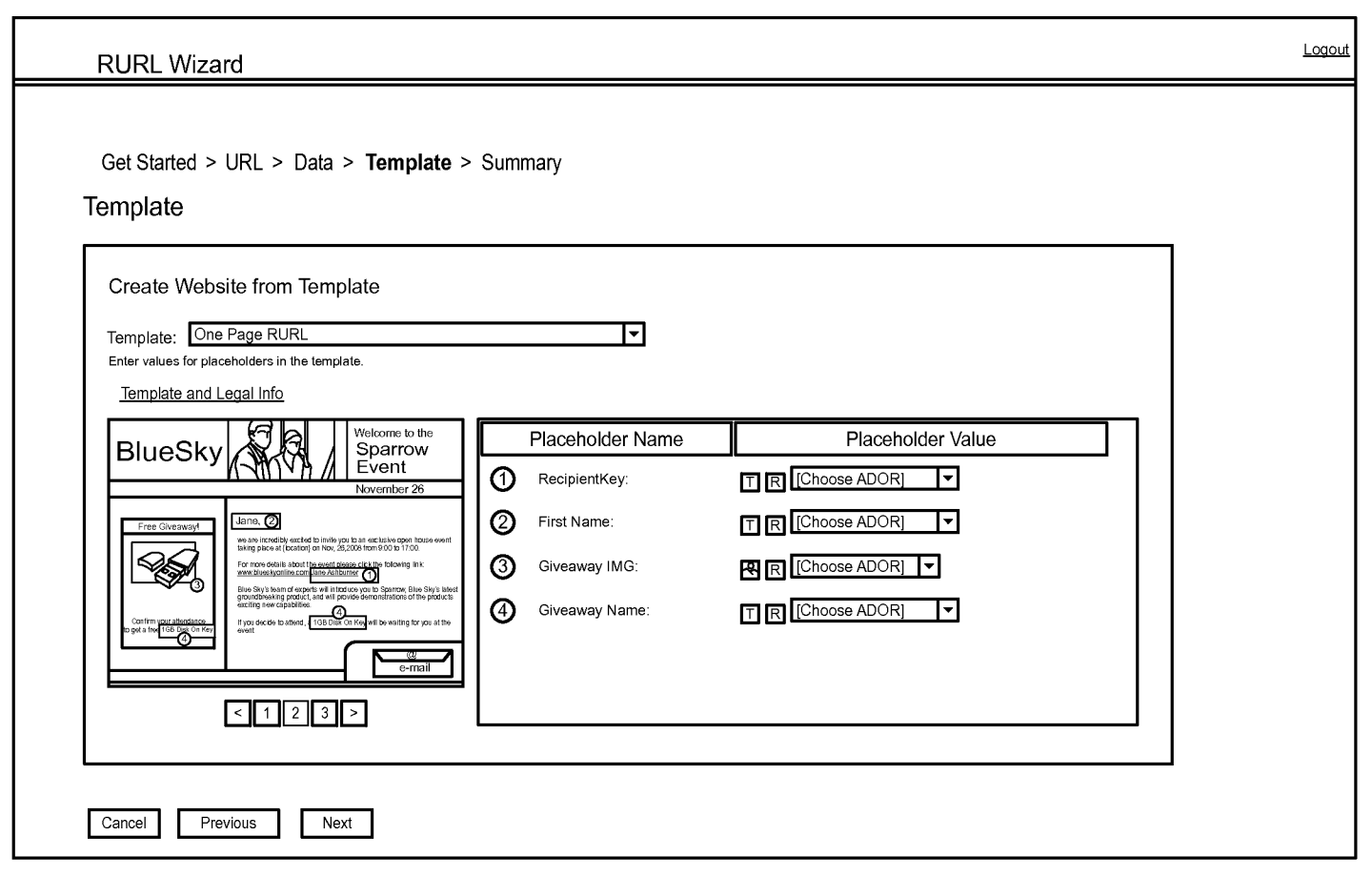

The template with placeholders could also be downloaded and imported into a desktop design environment that supports web development. In such an environment, the templates are refined and then used by a wizard. FIG. 7 illustrates an exemplary wizard page where placeholders are associated with objects defined in a plan file that contains campaign logic. The wizard uses a template with placeholders, along with a plan file, data, and assets, to support the creation of personalized response web pages.

Figure 8:
FIG. 8 is a schematic diagram illustrating a sale postcard.

The example shown in FIG. 8 is a product offer design sample that could be created using the disclosed embodiments, where the tagging occurs at different levels of abstraction. In the example shown in FIG. 8, the text "Shoes" could be tagged with the concept "Good," indicating that in a sample variant "Shoes" could be replaced by text representing a different good such as "Garden Supplies." Similarly, "Bring in this card and receive 20% off your purchase" could be tagged with the concept "Call to Action" and the sub-text "20%" could be tagged with the concept "Status-Based Discount"; the latter tag suggests that a customer's "Status Level" is relevant to any logic and data that are added to a sample variant for a VDP system. Also, "One purchase per customer. Sale items excluded" could be tagged with the concept "Restrictions"; this tag indicates that a different restriction could be used in a sample variant. The text containing the company information could be tagged with the concept "Business". The text "Logo Here" could be tagged with the Business data property "Logo"; this and the previous "Business" tag indicate that a graphic of a business logo could be added as a resource file to a sample variant for a VDP system. The text "Mike" could be tagged with concept "Customer"; this tag suggests that a customer's "VCard" data property "First Name" is relevant to any logic and data that are added to a sample variant for a VDP system.

This notion of tagging a design can be extended by allowing the automatic insertion of a text or image into a design region to aid the graphic designer of a sample. For example, in FIG. 8 tagging an empty text region of the postcard with the concept "Restriction" could automatically insert the generic text "Place Restrictions Here" or if preferred, default text such as "One purchase per customer. Sales items excluded." The inserted text could be left as is or be modified by the graphic designer. As another example, tagging an empty image region could result in a default image to be inserted such as the one shown in FIG. 8 for logo.

As exemplified in the above design example, the embodiments herein encourage collaboration in the development of a VDP campaign collateral sample by multiple roles: logic developer/programmer, graphic designer, data specialist. These enable the graphic designer to develop sample templates independent of a campaign brief or logic, to create an initial graphic design sample for a high-level brief through the use of an applicable VDP pattern, and to collaborate in developing a VDP sample by initiating a graphic design in the absence of campaign logic or data schemas.

The VDP pattern-based palette is different than conventional tag libraries because its underlying knowledge base is hierarchical and captures the notions of concept relationships and data properties. InDesign tag libraries are distinguished from VDP patterns/elements for a number of reasons. For example, the VDP patterns support variable data campaigns while InDesign tag libraries support an XML representation of static design documents. Also, with embodiments herein, the tags are derived from VDP patterns to support collaboration between graphic designer, logic developer, data specialist, and client while InDesign tag libraries support adding structure to a graphic design via XML.

The hierarchical nature of the knowledge base promotes collaboration between the ultimate customer and the graphic designer. The customer is allowed to graphically see additional levels of patterns (through the hierarchical nature of the knowledge base) that the graphic designer may not have otherwise presented to the customer. Therefore, the hierarchical nature of the knowledge base graphically presents semantically interrelated concepts to the customer in a new and useful way.

Further, these enable the data specialist to initiate development of sample data based on a graphic design sample, in advance of receiving campaign logic. With embodiments herein, the logic developer can get requirements for a logic design based on a graphic design sample, and refine the logic design for a sample and pass it back to the graphic designer, who can then refine their sample design and tag it using the regular DTP plug-in for their VDP environment. The embodiments herein also enable a potential client to: see samples of the kinds of campaign collateral that may be suitable for their business; know what fixed information is required by the design sample, e.g., company logo, product image, etc.; know what customer information is required by the design sample, e.g., first name; and know what business logic is required to support "dependent" concepts required by the design sample, e.g., status-based discounts need to be determined for various status levels. These systems and methods facilitate the rapid and simplified creation of VDP marketing campaign collateral samples which would be of value to direct marketing firms, facilitate the creation of templates that could be used by wizard programs, and encourage increased communication and collaboration between the campaign client, the graphic designer, the logic developer, and the data specialist.

Figure 9:
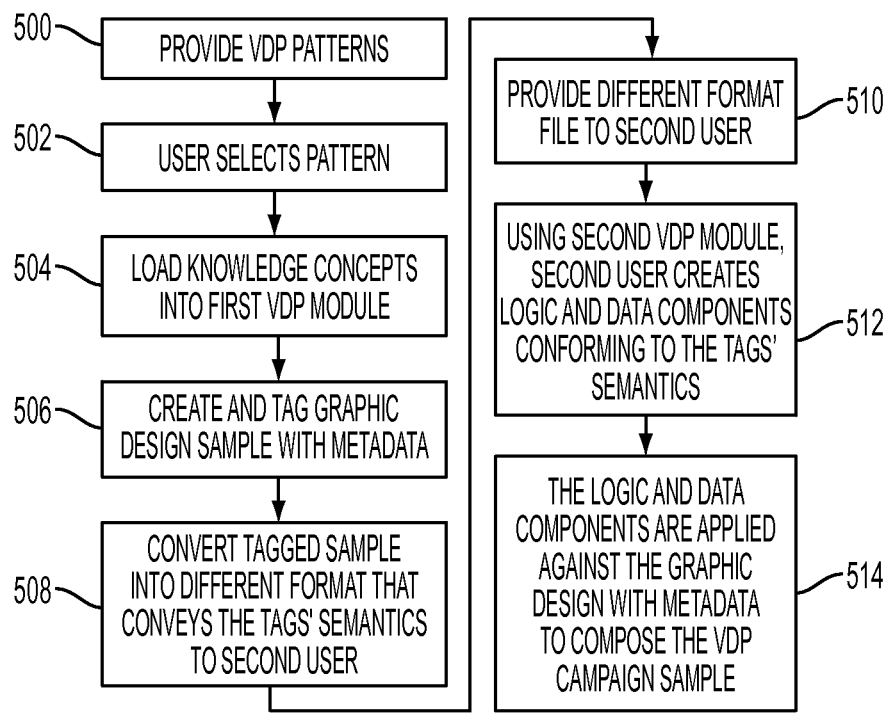
FIG. 9 is a flowchart diagram illustrating various method embodiments herein.

As shown in flowchart form in FIG. 9, various exemplary methods herein operate through one or more computerized devices and, in item 500, provide a first user (such as a graphic designer) with a selection of various variable data printing (VDP) patterns that represent different campaign types. In item 502, the user selects one of the VDP patterns and, in item 504, the embodiments herein load the VDP pattern element into the first module.

Each of the VDP patterns comprises a plurality of knowledge concepts. The knowledge concepts (VDP pattern elements) are knowledge engineered from commonly used types of marketing campaigns and may not necessarily be dependent upon or pre-associated with any schemas, VDP logic, or graphics. They are descriptors/tags for the types of semantic elements that appear in a graphic designer's work. The knowledge concepts themselves are expandable based on concept relationships and data properties, and form the basis of design tags.

The methods receive image, text, and graphics into the initial graphic design from the first user using a first VDP module. The 'first user' can be, for example, a graphic designer or one who goes about creating and tagging a graphic design. When the VDP pattern is selected, the underlying knowledge concepts are presented to the user to allow the user to do the tagging of such a design as the user creates the graphic design. The graphic designer creates image, text, and graphics in the graphic design area and then tags such image, text, and graphics with tags taken from the tags palette. Each of the image, text, and graphics represent variable or fixed text or images. In some cases, default or placeholder text or graphics can be inserted automatically when a graphic content area is tagged. The methods perform this tagging to create a tagged sample design in item 506.

In item 506, the methods create and tag the graphic design sample with metadata. During the tagging process in item 506, the methods receive image, text, and graphics into an initial sample design from the first user. The methods also receive selections of VDP pattern elements from the pallet from the first user that add metadata to the image, text, and graphics. Further, the methods can optionally insert sample text into the selected image, text, and graphics content areas. By associating the VDP pattern elements to specific image text and graphic in the graphic design, the methods herein alter the initial sample design into the tagged sample design.

The methods may then automatically convert the tagged sample design into one or more second files that have a different format that conveys the tags' semantics to the second user (e.g., format may be XML, uPlan skeleton, Excel skeleton, etc) in item 508. The methods may also automatically provide the different format file to one or more second users (such as a data specialist or logic developer) in item 510.

As mentioned above, the design's metadata may be converted from one format to another but this is not required. The metadata could be exported in a format that is readable by other roles if they choose not to view the design and tags within the original tagging environment. The semantic tags that were identified by the first user in 506 (FIG. 9) are exported in a form that the logic developer or data specialist is familiar with, and that they could use to, respectively, create logic for the tag's semantics. The second user creates logic or data conforming to the tags' semantics using a second VDP module in item 512. The logic developer and data specialist can be two different "second" users.

Figure 10:
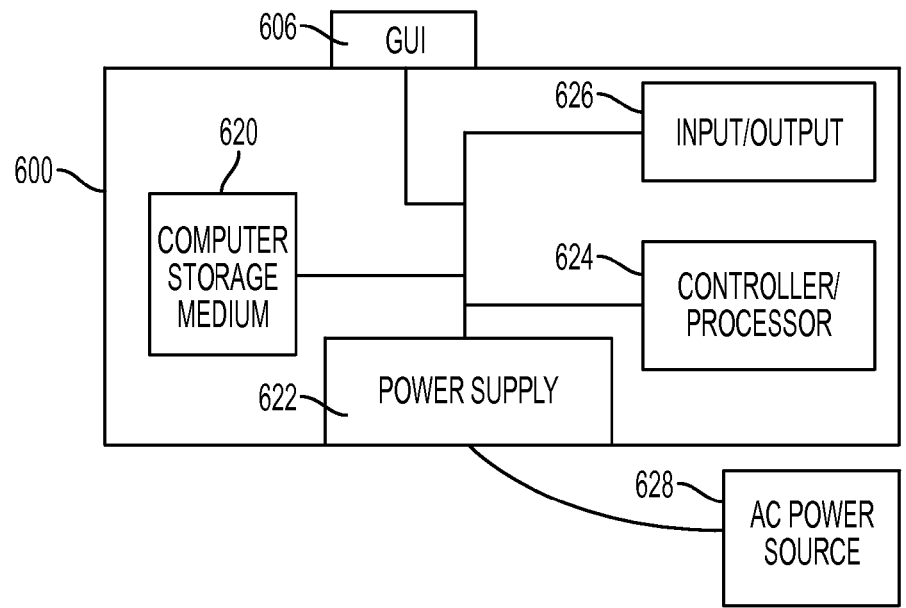
FIG. 10 is a schematic diagram of a storage computer device according to embodiments herein.
Figure 11:
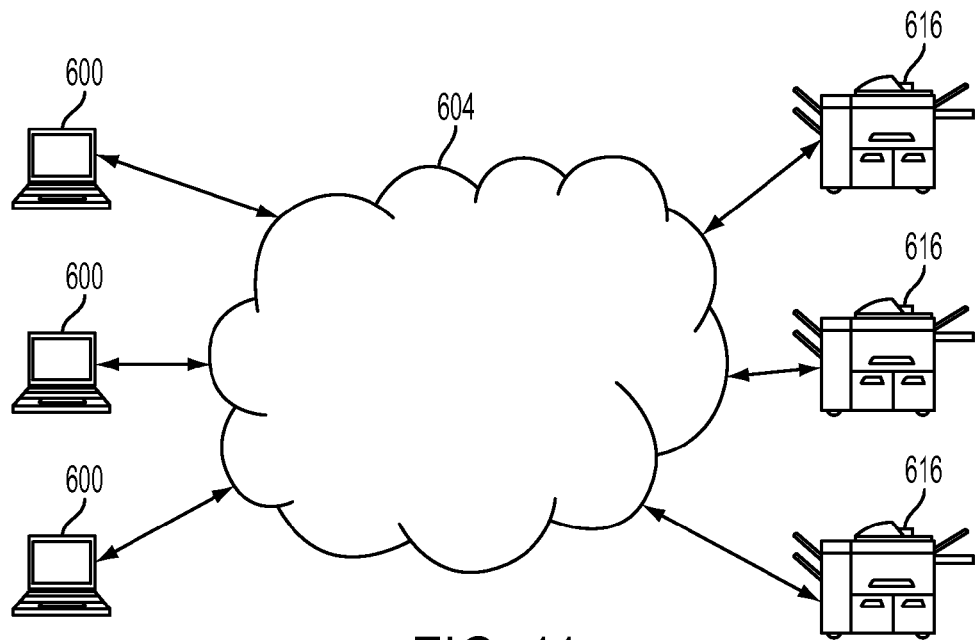
FIG. 11 is a schematic diagram of a network device according to embodiments herein.

Thus, the second file can optionally have a different format than that used by the first VDP module, and can instead be compatible with the second VDP module. A user may take the graphic design with metadata and apply VDP logic and data sources against it to create a set of VDP samples that conform to the design's metadata. The samples are for communication among all campaign roles and are not restricted just to the first user. In item 514, the logic and data components are applied against the graphic design with metadata to compose the VDP campaign sample. As shown in FIGS. 10 and 11, an exemplary system embodiment herein comprises one or more computerized devices 600 and one or more networks 604 operatively connected to the computerized devices 600. More specifically, each computerized device 600 includes a controller/processor 624, a communications port (input/output) 626 operatively connected to the processor 624 and to a computerized network 604 external to the computerized device 600, and a graphic user interface 606. A power supply 622 connects to an external alternating current power source 628 and converts the external power into the type of power needed by the various components.

A non-transitory computer storage medium 620 (which can be optical, magnetic, capacitor based, etc.) is readable by the processor 624 and stores instructions that the processor 624 executes to allow the computerized device to perform its various functions, such as those described herein. The computerized device 600 can be operatively connected to various printing devices 616 through the computerized network 604.

The computerized devices 600 provide a first user a selection of various variable data printing (VDP) patterns, each of the VDP patterns comprises a plurality of VDP pattern elements (that are sometimes referred to herein as knowledge concepts). In response, the computerized devices 600 receive a selection of at least one of the VDP patterns from the first user.

The computerized devices 600 then automatically loads the selected VDP pattern into a first VDP module to begin the creation of an initial sample design. The computerized devices 600 then receives image, text, and graphics from the user, and the user tags such image, text, and graphics with VDP pattern elements to create a tagged sample design. The receipt of the image, text, and graphics and the tagging of the image, text, and graphics alter the initial sample design into the tagged sample design.

Next, the computerized devices 600 can automatically convert the tagged sample design into at least one different format file that is different than the format used by the first VDP module. The computerized devices 600 can also automatically provide the different format file to at least one additional user using the network. The second users may create VDP logic and data sources against it to support a set of VDP samples that conform to the design's metadata. The samples are for communication among all campaign roles and not restricted just to the first user.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted here from to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:

receiving a selection of at least one variable data printing (VDP) pattern from a first user through at least one computerized device to provide selectable VDP pattern elements to support an initial sample design, said VDP pattern elements comprising concepts and data properties and being expandable by said first user into sub-concepts and related concepts through a graphic user interface of said at least one computerized device, and said VDP pattern being independent of a campaign plan file that includes campaign logic rules;

receiving at least one of image, text, and graphics into said initial sample design from said first user through said at least one computerized device, tagging said initial sample design using said VDP pattern elements by guiding said first user to associate ones of said VDP pattern elements with said image, text, and graphics through said graphic user interface, said receiving of said image, text, and graphics and said tagging altering said initial sample design into a tagged sample design prior to receiving said campaign plan file;

automatically converting said tagged sample design into at least one different format file that conveys semantics of tags in said tagged sample design using said at least one computerized device;

automatically providing said different format file to at least one second user using said at least one computerized device; and including, by said second user, data components into said different format file using said at least one computerized device to support composition of a targeted marketing campaign sample prior to said receiving said campaign plan file.

2. The method according to claim 1, further comprising, in response to said receiving of at least one of said image, text, and graphics, inserting sample text into said image, text, and graphics.

3. The method according to claim 1, said different file format being compatible with a VDP module used by said second user.

4. The method according to claim 1, said receiving of said image, text, and graphics and said tagging creates tags that add metadata to said image, text, and graphics.

5. The method according to claim 1, each of said image, text, and graphics represent variable or fixed text or images.

6. A method comprising:

providing a first user a selection of various variable data printing (VDP) patterns through at least one computerized device using a first VDP module to provide selectable VDP pattern elements to support an initial sample design, said VDP pattern elements comprising concepts and data properties and being expandable by said first user into sub-concepts and related concepts through a graphic user interface of said at least one computerized device, and said VDP pattern being independent of a campaign plan file that includes campaign logic rules;

receiving a selection of at least one of said VDP patterns from said first user through said at least one computerized device;

receiving at least one of image, text, and graphics into said initial sample design from said first user through said at least one computerized device, tagging said image, text, and graphics using said VDP pattern elements by guiding said first user to associate said VDP pattern elements with said image, text, and graphics through said graphic user interface, said receiving of said image, text, and graphics and said tagging altering said initial sample design into a tagged sample design prior to receiving said campaign plan file;

automatically converting said tagged sample design into at least one different format file that conveys semantics of tags in said tagged sample design using said at least one computerized device, said different format file being different than a format used by said first VDP module;

automatically providing said different format file to at least one second user using said at least one computerized device; and including, by said second user, data components into said different format file using a second VDP module and said at least one computerized device to support composition of a targeted marketing campaign sample prior to said receiving said campaign plan file.

7. The method according to claim 6, further comprising, in response to said receiving of at least one of said image, text, and graphics, inserting sample text into said image, text, and graphics.

8. The method according to claim 6, said different file format being compatible with said second VDP module.

9. The method according to claim 6, said receiving of said image, text, and graphics and said tagging creates tags that add metadata to said image, text, and graphics.

10. The method according to claim 6, each of said image, text, and graphics represent variable or fixed text or images.

11. A system comprising:
at least one computerized device comprising a processor, a communications port, and a graphic user interface; and
at least one network operatively connected to said communications port of said at least one computerized device;
said at least one computerized device providing a first user a selection of various variable data printing (VDP) patterns to provide selectable VDP pattern elements to support an initial sample design, said VDP pattern elements comprising concepts and data properties and being expandable by said first user into sub-concepts and related concepts through said graphic user interface, and said VDP pattern being independent of a campaign plan file that includes campaign logic rules;
said at least one computerized device receiving a selection of at least one of said VDP patterns from said first user;
said at least one computerized device automatically loading said VDP pattern elements of said VDP pattern into a first VDP module;
said at least one computerized device receiving at least one of image, text, and graphics into said initial sample design from said first user;
said at least one computerized device tagging said image, text, and graphics using said VDP pattern elements by guiding said first user to associate ones of said VDP pattern elements with said image, text, and graphics through said graphic user interface, said receiving of said image, text, and graphics and said tagging altering said initial sample design into a tagged sample design prior to receiving said campaign plan file;
said at least one computerized device automatically converting said tagged sample design into at least one different format file that conveys semantics of tags in said tagged sample design, said different format file being different than a format used by said first VDP module;
said at least one computerized device automatically providing said different format file to at least one second user using said network; and
said at least one computerized device including, based in input from said second user, data or logic components into said different format file using a second VDP module to support composition of a targeted marketing campaign sample prior to said receiving said campaign plan file.

12. The system according to claim 11, in response to said receiving of at least one of said image, text, and graphics, said at least one computerized device inserting sample text into said image, text, and graphics.

13. The system according to claim 11, said different file format being compatible with said second VDP module.

14. The system according to claim 11, said receiving of said image, text, and graphics and said tagging creates tags that add metadata to said image, text, and graphics.

15. The system according to claim 11, each of said image, text, and graphics represent variable or fixed text or images.

16. A computer storage device comprising a non-transitory computer-readable storage medium storing instructions executable by a computer, said instructions causing said computer to perform a method comprising:
receiving a selection of at least one variable data printing (VDP) pattern from a first user through at least one computerized device to provide selectable VDP pattern elements to support an initial sample design, said VDP pattern elements comprising concepts and data properties and being expandable by said first user into sub-concepts and related concepts through a graphic user interface of said at least one computerized device, and said VDP pattern being independent of a campaign plan file that includes campaign logic rules;
receiving at least one of image, text, and graphics into said initial sample design from said first user through said at least one computerized device,
tagging said initial sample design using said VDP pattern elements by guiding said first user to associate ones of said VDP pattern elements with said image, text, and graphics through said graphic user interface, said receiving of said image, text, and graphics and said tagging altering said initial sample design into a tagged sample design prior to receiving said campaign plan file;
automatically converting said tagged sample design into at least one different format file that conveys semantics of tags in said tagged sample design;
automatically providing said different format file to at least one second user; and
including, by said second user, data components into said different format file to support composition of a targeted marketing campaign sample prior to said receiving said campaign plan file.

17. The computer storage device according to claim 16, said method further comprising, in response to said receiving of at least one of said image, text, and graphics, inserting sample text into said image, text, and graphics.

18. The computer storage device according to claim 16, said different file format being compatible with a second VDP module.

19. The computer storage device according to claim 16, said receiving of said image, text, and graphics and said tagging creates tags that add metadata to said image, text, and graphics.

20. The computer storage device according to claim 16, each of said image, text, and graphics represent variable or fixed text or images.

* * * * *